US006553348B1

(12) United States Patent
Hashimoto (10) Patent No.: US 6,553,348 B1
(45) Date of Patent: Apr. 22, 2003

(54) SALES MANAGEMENT APPARATUS (75) Inventor: Manabu Hashimoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/114,157

(22) Filed: Jul. 13, 1998

(30) Foreign Application Priority Data

Aug. 25, 1997 (JP) ............................................. 9-227853

(51) Int. Cl.[7] .............................................. G06F 17/60
(52) U.S. Cl. ............................. 705/16; 705/18; 705/17; 705/21
(58) Field of Search .............................. 705/16, 17, 18, 705/20, 21, 7, 24, 26, 28; 703/23; 235/462.47, 472.01; 710/67; 708/146

(56) References Cited

U.S. PATENT DOCUMENTS

| 3,662,342 A | * | 5/1972 | Hedin et al. ................. 340/147 |
| 3,674,199 A | * | 7/1972 | Mattsson et al. ............. 235/36 |
| 3,843,874 A | * | 10/1974 | Kelch ....................... 235/150.2 |
| 4,220,991 A | * | 9/1980 | Hamano et al. ............. 364/405 |
| 4,245,331 A | | 1/1981 | Hamano et al. |
| 4,729,097 A | * | 3/1988 | Takaoka et al. ............. 364/405 |
| 5,565,857 A | * | 10/1996 | Lee ....................... 340/825.34 |
| 5,607,267 A | * | 3/1997 | Heredia et al. ............... 409/81 |
| 5,708,781 A | * | 1/1998 | Chiashi et al. ......... 395/200.11 |
| 5,734,928 A | * | 3/1998 | Nakasuji .................... 395/887 |
| 5,745,705 A | * | 4/1998 | Iguchi ........................ 395/221 |
| 5,794,214 A | * | 8/1998 | Ebina et al. .................. 705/24 |
| 5,805,831 A | * | 9/1998 | Fuyama ..................... 395/216 |
| 5,850,187 A | * | 12/1998 | Carrander et al. ...... 340/825.54 |
| 5,870,714 A | * | 2/1999 | Shetty et al. ................. 705/20 |
| 5,895,452 A | * | 4/1999 | Lum ............................ 705/16 |
| 5,903,877 A | * | 5/1999 | Berkowitz et al. ............ 705/26 |
| 5,918,211 A | * | 6/1999 | Sloane ......................... 705/16 |
| 5,918,212 A | * | 6/1999 | Goodwin, III ............... 705/26 |
| 5,924,079 A | * | 7/1999 | Brown ......................... 705/16 |
| 5,924,080 A | * | 7/1999 | Johnson ....................... 705/26 |
| 5,930,770 A | * | 7/1999 | Edgar .......................... 705/28 |
| 5,933,812 A | * | 8/1999 | Meyer et al. ................. 705/15 |
| 5,933,813 A | * | 8/1999 | Teicher et al. ............... 705/26 |
| 5,937,386 A | * | 8/1999 | Frantz .......................... 705/1 |
| 5,937,393 A | * | 8/1999 | O'Leary et al. ............. 705/21 |
| 5,943,309 A | * | 8/1999 | Kawamoto et al. .......... 200/44 |
| 5,978,772 A | * | 11/1999 | Mold ........................... 705/16 |
| 6,065,679 A | * | 5/2000 | Levie et al. ............. 235/462.47 |

FOREIGN PATENT DOCUMENTS

| CA | 1 209 275 | * | 3/1992 | ......... G06F/3/2315 |
| DE | 2840981 A1 | | 4/1979 | |
| EP | 0295658 | | 12/1988 | |
| EP | 0 507 241 A2 | * | 3/1992 | ............ G07G/1/12 |
| EP | 0507241 A2 | | 10/1992 | |
| EP | 0862154 A2 | * | 2/1998 | ............ G07G/1/12 |
| EP | 0 899 700 A2 | * | 7/1998 | ............ G07G/1/12 |
| JP | A2-270084 | | 11/1990 | |
| JP | A6-26266 | | 2/1994 | |
| JP | A8-153277 | | 6/1996 | |
| WO | WO9535549 | | 12/1995 | |

OTHER PUBLICATIONS

Computer Dictionary, Microsoft Press, Third edition, pp. 170, 178, 179 and 199, 1997.*
JP–A–02–270084, Nov. 5, 1990, abstract only.
JP–A–01–269198, Oct 26, 1989, abstract only.

* cited by examiner

Primary Examiner—Vincent Millin
Assistant Examiner—Pedro Kanof (57) ABSTRACT In a sales management apparatus, control programs necessary for operating in different modes are stored in respective mode keys and any desirable control program is loaded by using a corresponding mode key to realize saving in memory capacity of the apparatus. A sales management apparatus having a memory for writing and reading a control program, a mode key having a memory for storing a control program, means for registering a person in charge according to data provided from the mode key and means for transmitting the control program from the mode key, which can switch a control program to another, e.g., registering, setting, checking or exact calculation program by replacing a mode-key by another.

16 Claims, 9 Drawing Sheets

FIG.5A  MENU KEYS FOR A FAST-FOODER

| JUICE | HOT | SAND-WICH | | | | |
|---|---|---|---|---|---|---|
| OR-ANGE | APPLE | TUNA | | | | |
| COF-FEE | OR-ANGE | HAM | | | | |
| TEA | GRAPE | EGG | | | | |
| CAKE | LEMON | MEAT | | | | |

FIG.5B  MENU KEYS FOR A RESTAURANT

| STEAK | SOUP | | | | | |
|---|---|---|---|---|---|---|
| BEEF | | | | | | |
| POKE | | | | | | |
| CHICK-EN | | | | | | |
| FISH | | | | | | |

FIG.5C  MENU KEYS FOR A BAR

| BEER | COCK-TAIL | | | | | |
|---|---|---|---|---|---|---|
| DIS-TILLED SPIRITS | NUTS | | | | | |
| WINE | DRIED CUTTLE-FISH | | | | | |
| BOUR-BON | | | | | | |
| SCOTCH WHISKEY | | | | | | |

SALES MANAGEMENT APPARATUS

BACKGROUND OF THE INVENTION

The present invention relates to a sales management apparatus such as an electronic cash register, or a point-of-sale terminal.

Japanese Laid-open Patent Publication No. 2-270084 discloses a hand-held computer for changing preset data and collecting data from various kinds of industrial measuring instruments by using IC cards prepared according to kinds of a target instrument because transmission methods and applications are different depending on the kinds of industrial measuring instruments. The hand-held computer directed that the exchange of the IC card enables to briefly change to the hand-held for the each target industrial measuring instrument.

Japanese Laid-open Patent Publication No. 8-153277 discloses a sales management apparatus that allows a mode key to change any positions while a conventional mode key has a fixed position.

Japanese Laid-open Patent Publication No. 6-26266 discloses an electronic key used for a electronic key system of a safe deposit box system, which contains a flash read-only memory for storing the user's personal data (e.g., an address) and an operation record (e.g., the date of latest use). A safe deposit box system operates by sensing the insertion of the key into the safe deposit box and checking the data stored in the memory of the key to protect wrong usage of the key.

The present invention is directed to a sales management apparatus that can adapt itself to a variety of tasks by using insertion type mode-keys to select any of the control programs without changing any other preset data memory and a sales-data memory to save memory and increase the security of the body of the sales management apparatus.

SUMMARY OF THE INVENTION

The object of the present invention is to provide a sales management apparatus which selectively uses separate mode keys holding any one of control programs Registration, Preset, Check and Exact Calculation in their read-only memories, receives the transmitted control program from the mode key inserted therein and writes it into its memory. The control program can be replaced with another program by using another mode key instead. Namely, the apparatus has no need of always holding all the control programs, thus realizing saving in its memory capacity.

Another object of the present invention is to provide a sales management apparatus which can clear off all control programs used therein when a mode key is removed therefrom. This increases the security of the apparatus since it cannot be operated Registration, Setting, Checking and Exact Calculation after removal of the mode key.

Another object of the present invention is to provide a sales management apparatus which uses separate mode keys having different control programs for a fast-food, restaurant and a bar, respectively, in their read-only memories. The apparatus can work with a control program transmitted from the mode key inserted therein and can adapt itself to a different working style by using a corresponding mode key instead. This enables the apparatus to be used in a store that changes its working style for different time-periods in a day. In other words, the apparatus can easily obtain any desired control program including a different layout and content of menu keys and processing functions by replacing a current mode key with a desired mode key.

Another object of the present invention is to provide a sales management apparatus which can receive a control program from a mode key by using contactless infrared transmission. This reduces the mechanical contact of the mode key with the apparatus, thus reducing the possibility of mechanical troubles in the apparatus.

Another object of the present invention is to provide a sales management apparatus which is featured by using a flash memory in the apparatus to increase the reliability of data.

Another object of the present invention is to provide a sales management apparatus which is featured in that the mode key stores merely setting and exact calculating control programs requiring higher security, thus by reducing the frequency of transmitting the control program to the sales management apparatus, realizing reduction in time of transmitting control programs and number of writing operations to the flash memory which takes a lot of time for writing compared with conventional Random Access Memory and has a limitation on number of writing operations.

Another object of the present invention is to provide a sales management apparatus which is featured in that it has a function for transmitting sales result data to the mode key that can then transfer said sales result data to another sales management apparatus.

(1) The present invention resides in a sales management apparatus having a memory for writing and reading a control program, means for changing a person in charge by the mode key, a memory for storing a control program in the mode key and a means for transmitting the control program from the mode key, characterized in that said apparatus can operate according to control programs replaceable with another program by replacing the mode key with another mode key with any one of different control programs for Registration, Setting, Checking, Exact calculation and so on, whereby the apparatus can work with a saved capacity of its memory.

(2) The present invention further resides in the invention as mentioned above (1) characterized in that the control program is cleared off, as pulling out the mode-key, to completely forbid its operation.

(3) The present invention further resides in a sales management apparatus having a memory for writing and reading a control program, means for changing a person in charge by the mode key, a memory for storing a control program in the mode key and a means for transmitting the control program from the mode key, characterized in that said a control program stored in a mode key is changeable with another program different in position of menu keys, kind of menu to deal with, processing functions and the like.

(4) The present invention further resides in the invention as mentioned above any one of (1) to (3) characterized in that the control program can be transmitted from the mode key to the sales management apparatus by using infrared transmission to reduce contact area of said apparatus with the used mode-key.

(5) The present invention further resides in the invention as mentioned above any one of (1) to (3) characterized in that the memory disposed in the sales management apparatus is a flash memory.

(6) The present invention further resides in the invention as mentioned above (5) characterized in that the mode key stores solely setting and exact calculating programs requiring higher security which realizes reducing time of transmission and the number of writing operations by reducing the frequency of transmission of control programs from the mode key.

(7) The present invention further resides in the invention as mentioned above (1) characterized in that said apparatus has a function for transmitting sales result data to the mode key and the mode key can transfer said sales result data to the another sales management apparatus.

PREFERRED EMBODIMENT OF THE INVENTION

Figure 1:
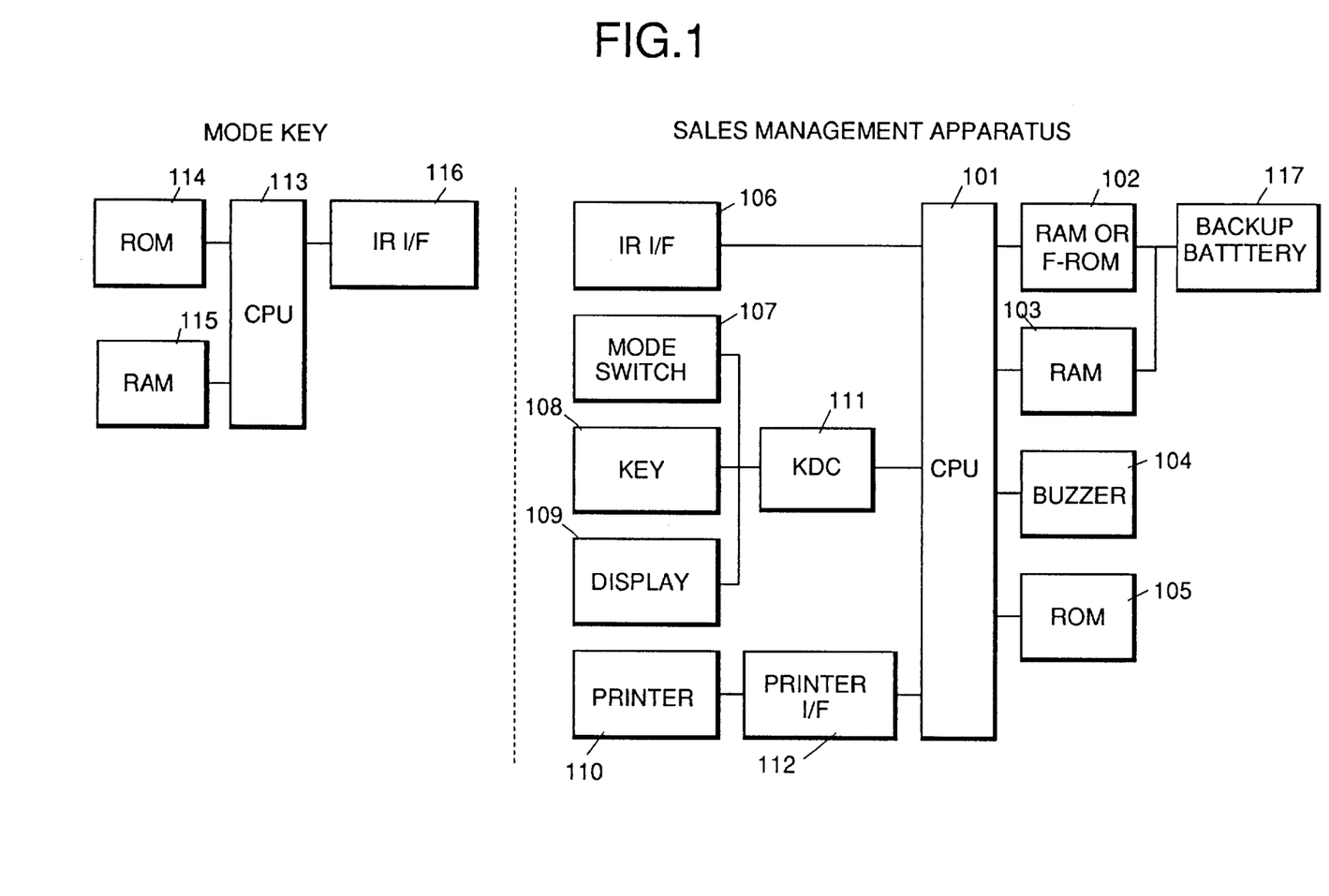
FIG. 1 is a block diagram of an embodiment of the present invention.

FIG. 1 is a block-diagram of a sales management apparatus with a mode key, which is an embodiment of the present invention.

As shown in FIG. 1, the sales management apparatus comprises:
- a center processing unit (CPU) 101 for controlling a whole system of the sales-management apparatus;
- a read-only memory (ROM) 105 holding microinstructions for control of peripherals (e.g., a printer 110, KDC 111, a buzzer 104 and an IR interface 106);
- a random-access memory (RAM) or a flash ROM 102 holding microinstructions for carrying out data registration, setting, checking and exact calculation by using the printer 110, keys 108, a display 109 and a buzzer 104 respectively; RAM 103 holding data preset for each unit item of sales, sales data, preset data on a current operator, data on his or her sales result and work buffer data;
- a buzzer 104 for generating a warning sound signal;
- a printer interface 112 consisting of a printer control circuit, a driver circuit and a timing signal circuit;
- a printer 110 for printing results of transaction, checking, exact calculation and preset data on a receipt and a journal;
- KDC 111 for controlling a keyboard 108 and a mode switch 107;
- a mode switch 107 into which a mode switch is insatiable to select ON-position at which data is receivable and operation is ready.
- a keyboard 108 for inputting data to be registered and preset;
- a display 109 for displaying input data, an error message and operation guide information.

A mode key comprises:
- a CPU 113 for controlling all circuits of the mode key;
- a ROM or flash read-only memory (FLASH ROM) 114 holding microinstructions for controlling peripherals (e.g., an infrared interface 116);
- a RAM 115 holding preset data for each item, sales results, preset data and sales result data for a current operator and work buffer.

The use of the ROM 102 for storing control programs instead of the RAM 102 eliminates the need for a backup battery 117. This realizes an aspect of the sales management apparatus of present invention having higher reliability.

Figure 2:
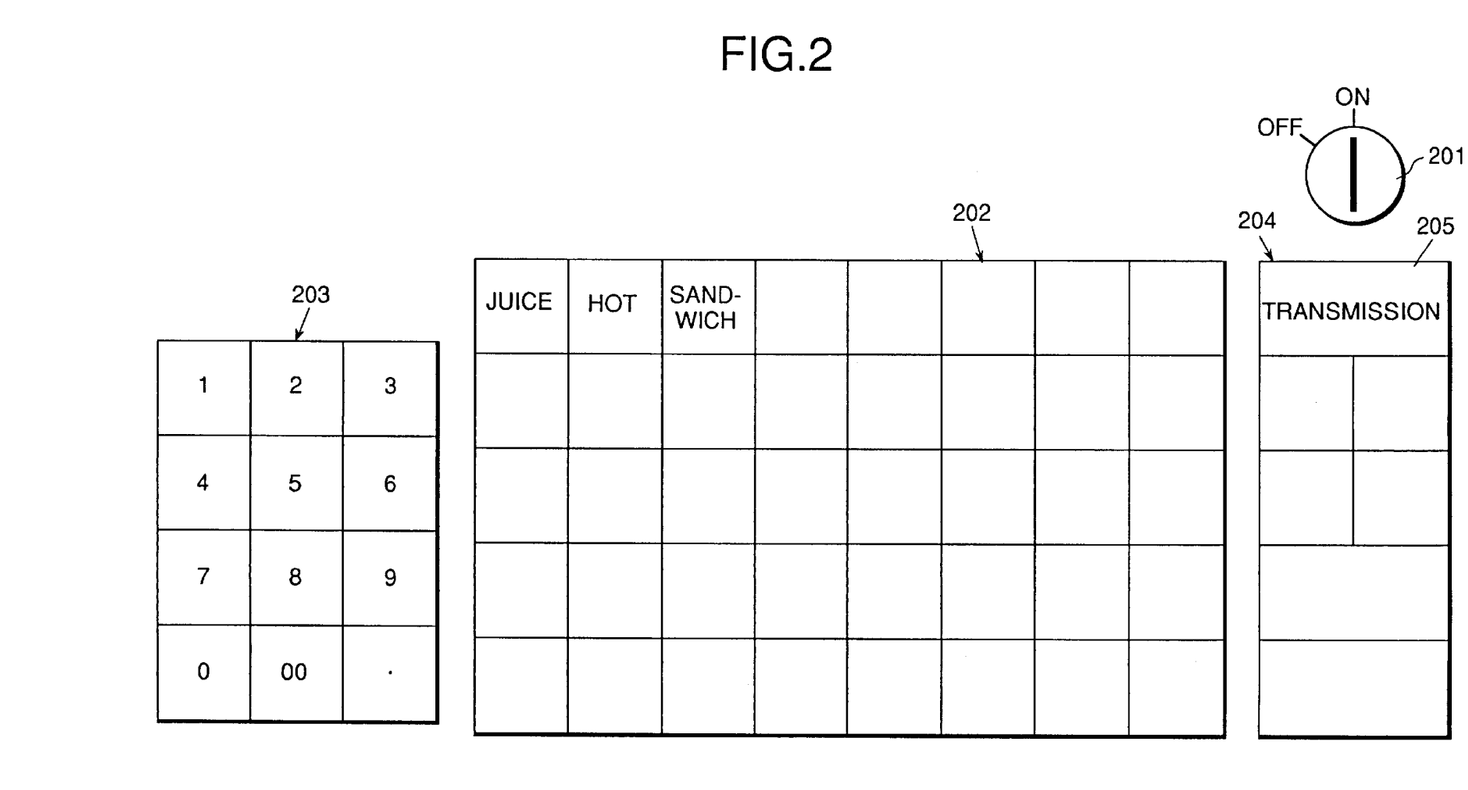
FIG. 2 is a view of a keyboard of an embodiment of the present invention.

FIG. 2 shows a keyboard and a mode switch, which are used in an embodiment of the present invention.

The keyboard comprises:
numeral keys 203 for inputting data such as a unit price, a total price, quantity and an operator's code; menu keys 202 for registering each item for sale; function keys 204 such as cash sale, % and −; a mode switch 201 allowing an operator to insert a key into a slot thereof and turn it from the OFF-position to the ON-position at which the sales management apparatus can receive/transmit data from/to the mode key and becomes ready to operate; and a transmission key 205 for transmitting data from the sales management apparatus to the mode key.

Figure 3:
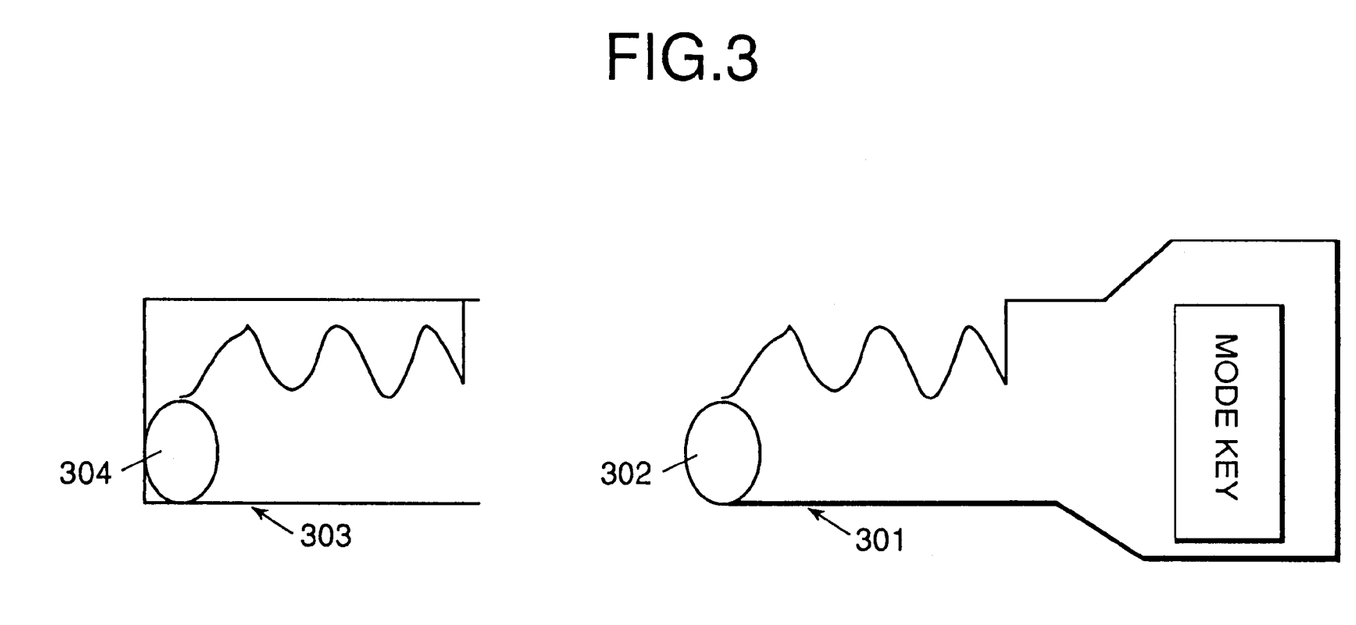
FIG. 3 is a construction view of a mode switch and a mode key for an embodiment of the present invention.

FIG. 3 shows an inside construction of a mode switch and a construction of a mode key, which are used in the embodiment of the present invention.

The mode key 301 contains an infrared receiving/transmitting portion 302 for conducting infrared data transmission 302 and the mode switch 303 also contains an infrared receiving/transmitting portion 304 for conducting infrared data transmission from and to the mode key.

The contactless infrared data transmission between infrared receiving/transmitting portions 302 and 304 reduces the occurrence of errors in transmission. This realizes the present invention.

Figure 4:
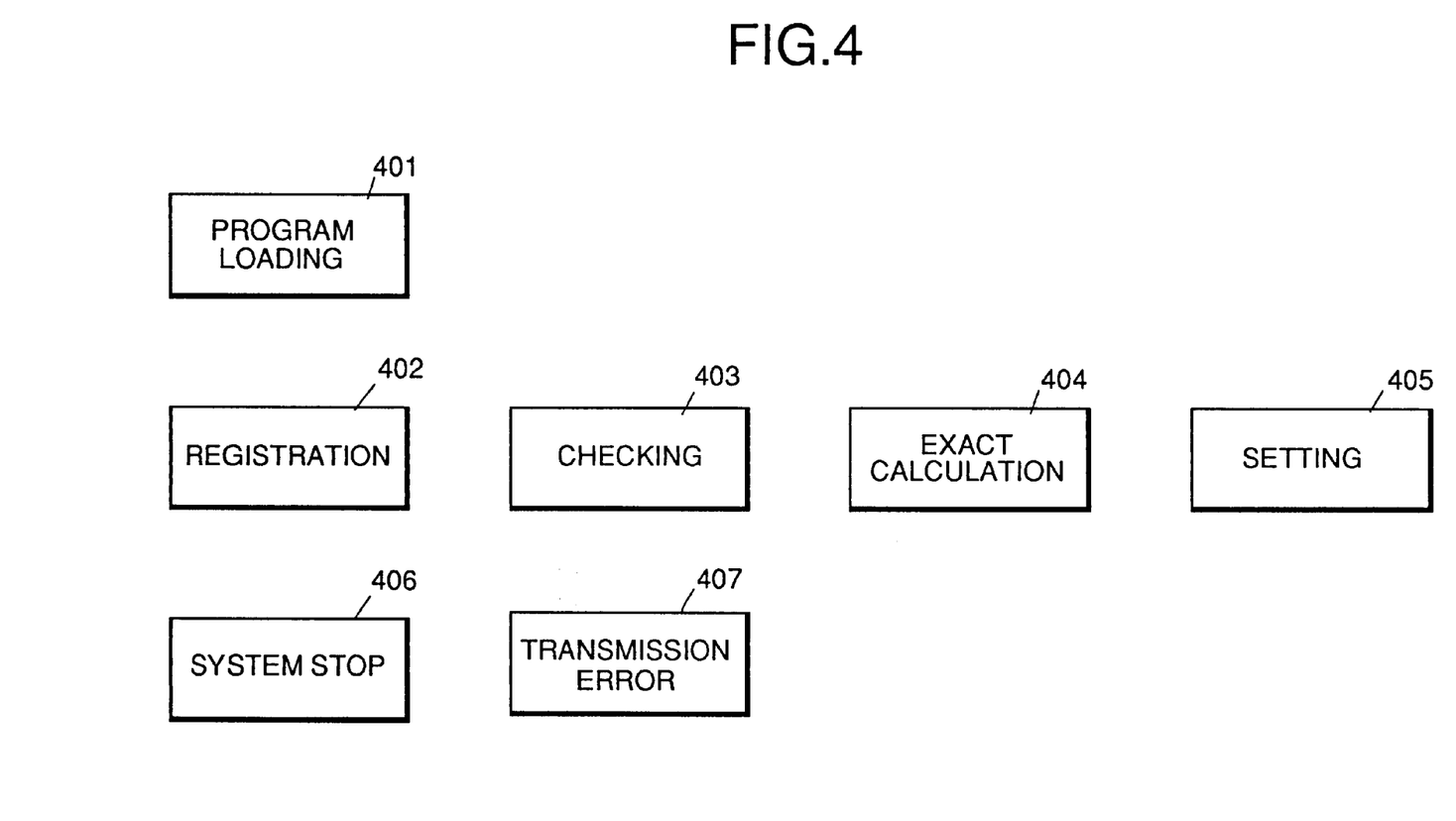
FIG. 4 shows an example of display on an embodiment of the present invention.

FIG. 4 shows an example of what is displayed on a display screen while data is transmitted from the mode key to the sales management apparatus.

When the operator inserted the mode key into a slot of the mode switch and turned the key to set the switch into the ON-position, information 401 "program load" appears to indicate that data is exchanged between the mode key and the sales management apparatus.

A program name "Registering" 402, "Checking" 403, "Exact Calculation" 404 or "Setting" 405 appears to previously indicate that the program has been correctly loaded and normally starts.

When the mode key was pulled out of the mode switch, information "System Stops" 406 is displayed to indicate that the sales management apparatus cannot be operated because of the absence of the control program.

An error message 407 is displayed to indicate that an error in transmission of data between the mode key and the apparatus occurred.

Figure 5A:
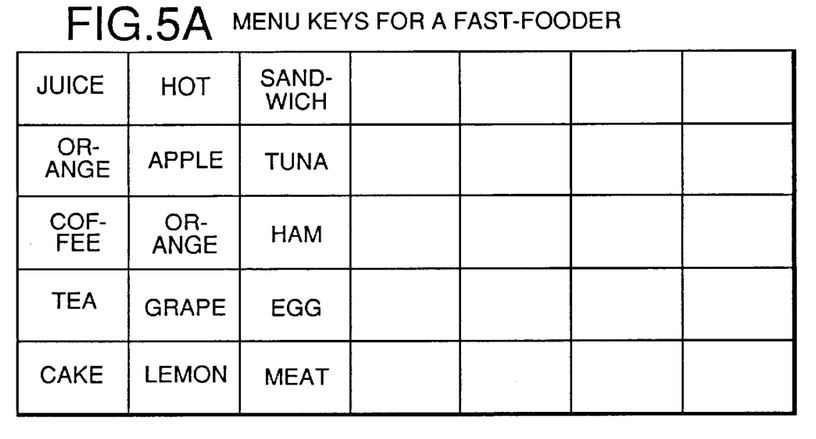
FIG. 5 shows a layout of menu keys of an embodiment of the present invention.
Figure 5B:
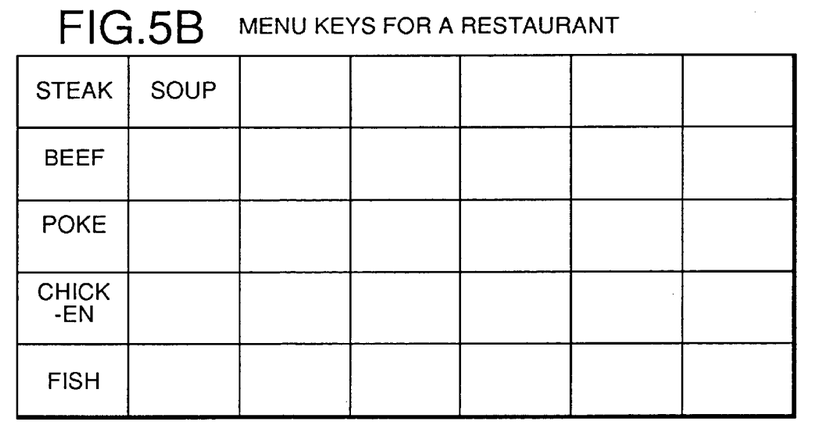
Figure 5C:
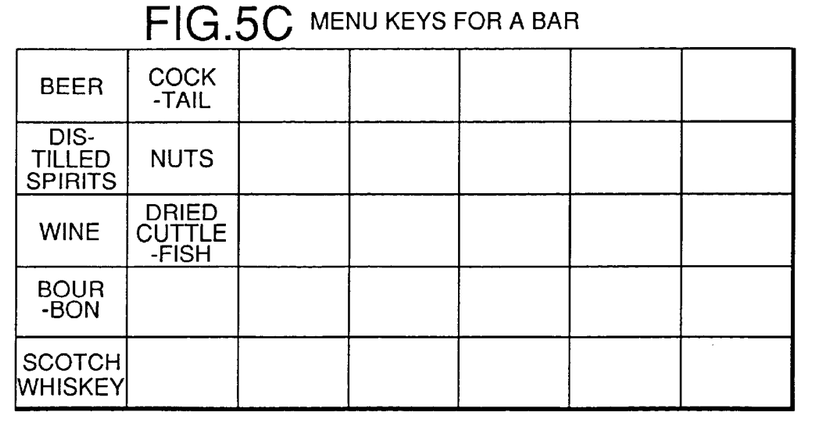

FIGS. 5A to 5C show exemplified key layouts of three different menus for a restaurant which changes working style for time zones in a day.

FIG. 5A shows an example of menu keys for fast food to be provided in the morning.

When a fast-food control program 605 (in FIG. 6) was loaded from a mode key holding the program, a set of fast-food menu-keys appears on the display screen as shown in FIG. 5A.

FIG. 5B shows an example of restaurant menu-keys for dishes to be provided in the afternoon.

When a restaurant control program 606 (in FIG. 6) was loaded from a mode key holding the program, a set of restaurant menu-keys appears on the display screen as shown in FIG. 5B.

FIG. 5C shows an example of menu-keys for a bar in the night hours.

When a bar control program 607 (in FIG. 6) was loaded from a mode key holding the program, a set of bar menu-keys appears on the display screen as shown in FIG. 5C.

These layouts of menu-keys can be changed to each other by merely loading respective programs "Fast-food program" 605, "Restaurant program" 606 and "Barroom program" 607 into the sales management apparatus. This realizes the present invention.

Figure 6:
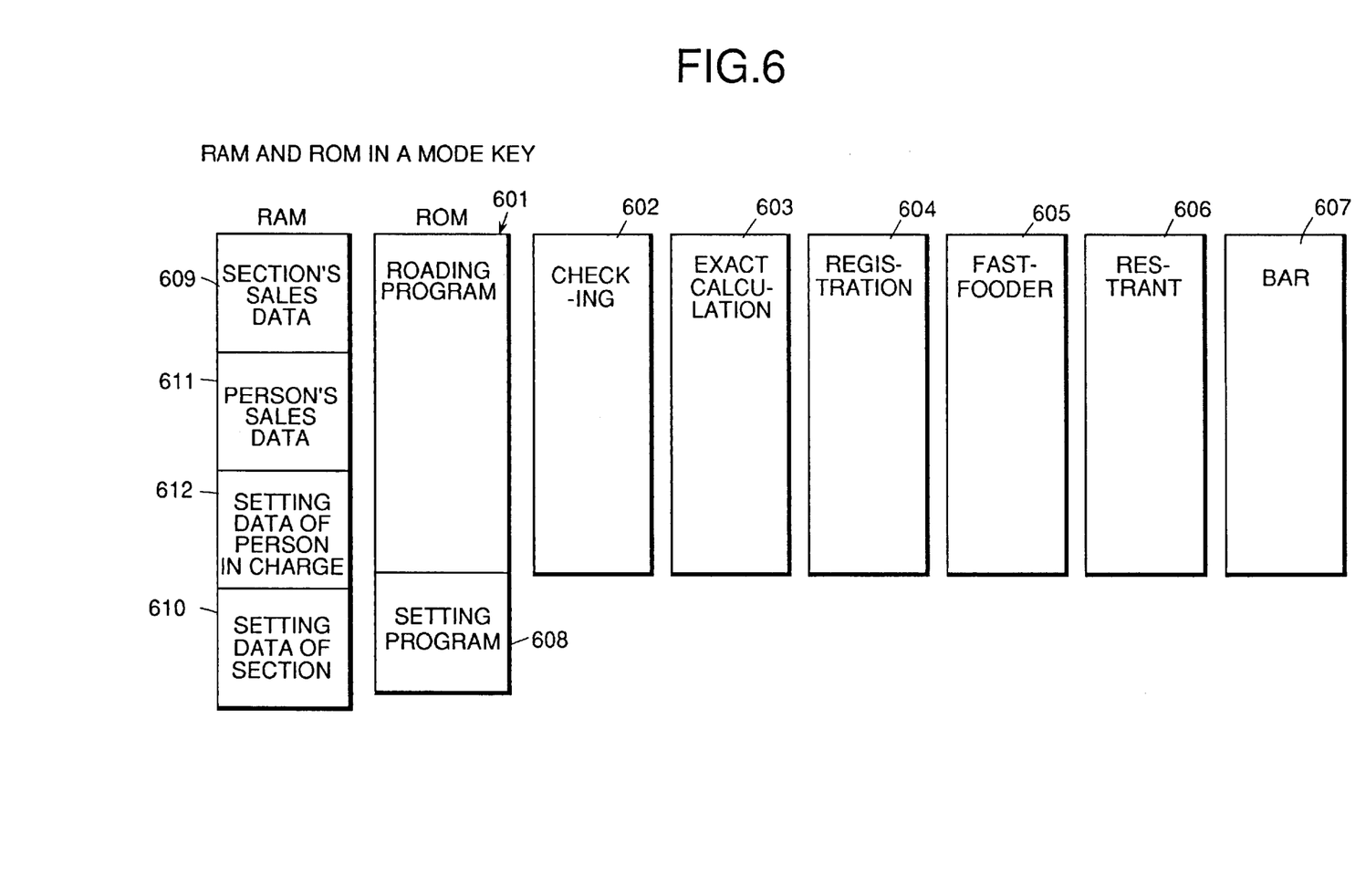
FIG. 6 shows a layout of random-access and read-only memories in a mode key of an embodiment of the present invention.

FIG. 6 shows a ROM and a RAM included in the mode key.

The individual mode key has the any one of following control program in the ROM: a setting program 601 for transmitting data to the sales management apparatus, a checking program 602, an exact calculation program 603, a registering program 604, a fast-food program 605, a restaurant program 606 and a barroom program 607.

A load program 608 for loading the control programs into the sales management apparatus is provided in the ROM. On receipt of a request command from the apparatus, the CPU 113 of FIG. 1 in the mode key drives the loading program to transmit the control programs, setting data and sales-result data to the apparatus through the IR interface 116.

All the programs 601, 602, 603, 604, 605, 606, 607 are loaded into the RAM or F-RAM 102 of the sales management apparatus by using data transmission facilities of the mode key and the apparatus. This can realize an embodiment of the present invention.

The sales management apparatus usually holds the checking program 602 and the registering program 604 as residents in the ROM 105 and will be loaded with the setting program 601 and the exact calculation program 603 in its RAM or F-RAM 102 from the mode key through the infrared data transmission. This is because the latter two programs require higher security than the resident programs. Thus the present invention is realized.

The RAM of the mode key may store sales result data 609 for each section and sales result data 611 for each person in charge, which have been registered by the sales management apparatus. The mode key before being removed from the mode switch of the apparatus body receives the sales result data including the above-mentioned data from the apparatus and writes the data into the RAM 103.

The data preset for the person in charge 612 and the data preset for the section 610 together with the control programs are transmitted from the mode key to the sales management apparatus just after turning on the mode switch by the mode key inserted thereunto.

Thus the present invention is realized.

FIGS. 7A, 7B, 8A, 8B and 9 are flow charts describing the processing procedure according to the present invention.

The shown example depicts a method for transmitting and receiving program data and preset sales data.

Figures 7A, 7B:
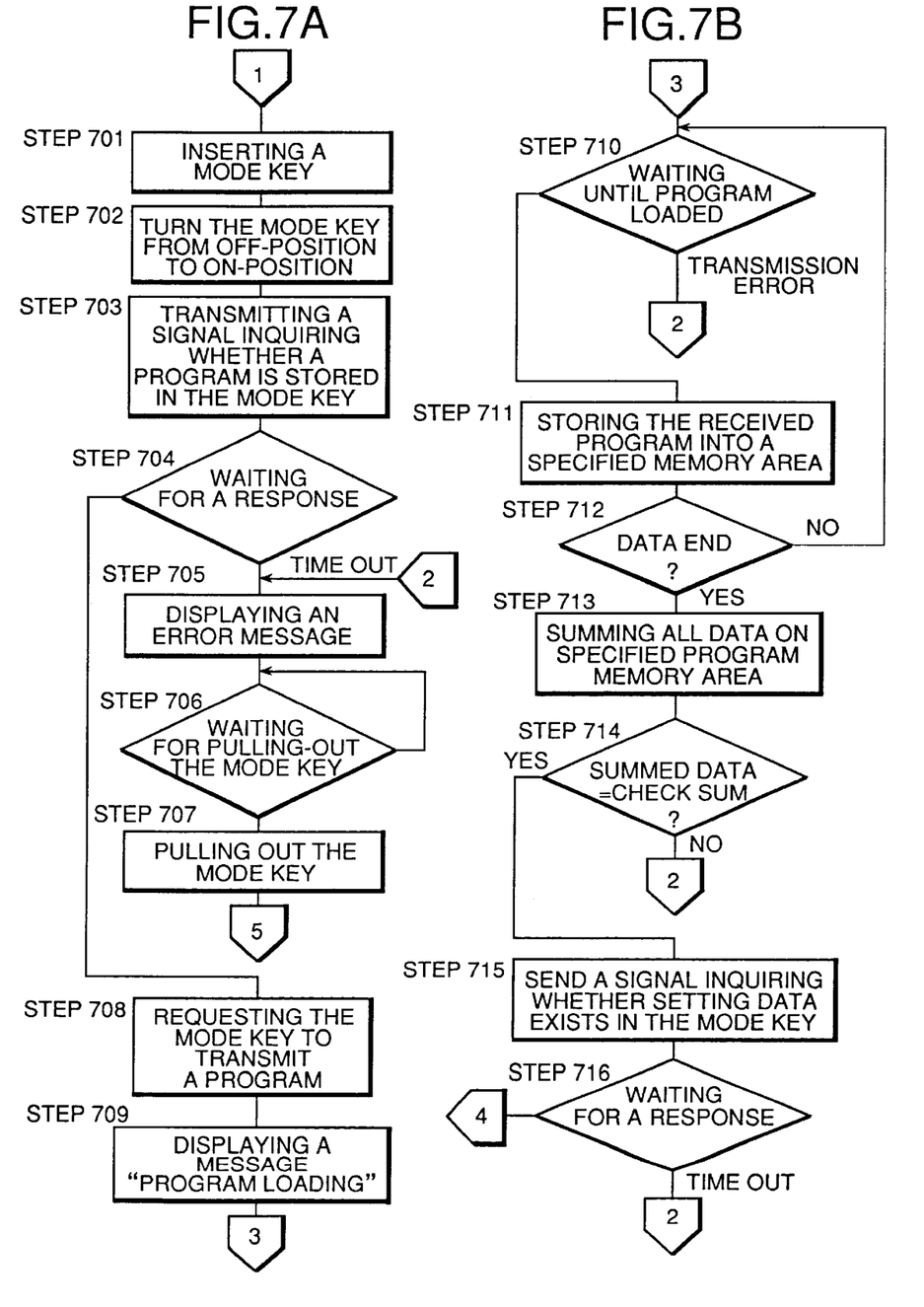
FIG. 7A is a flowchart (1) depicting the operation procedure of an embodiment of the present invention.
FIG. 7B is a flowchart (2) depicting the operation procedure of an embodiment of the present invention.

The procedure of receiving the program data and preset sales data is described first as follows:

At Step 701, the mode key 301 is inserted into the mode switch 201.

At Step 702, the mode key 301 is turned from OFF position to ON position of the mode switch 201. At the same time, the KDC 111 of the sales management apparatus informs the CPU 101 that the mode switch is switched ON.

At Step 703, the sales management apparatus sends a signal to the made key 301 to inquire whether the mode key stores the programs required. The inquiring signal is prepared by the CPU 101 according to a format defined by the loading program 105 and then transmitted to the mode key 301 by means of the IR interface 106.

At Step 704, the apparatus waits for a response from the mode key 301. Upon receipt of the response, the procedure advances to Step 708. If an error occurred, the procedure proceeds to Step 705 for processing the error.

At Step 705, a transmission error message 407 is displayed on the display 109 to inform the operator that no response was made from the mode key.

At Step 706, the apparatus waits until the mode switch 201 is turned OFF at which time the mode key can be pulled out. The KDC 111 senses turning-off of the mode switch and sends a detection signal to the CPU 101.

At Step 707, the sales management apparatus judges by the OFF-position of the mode switch 201 that the mode key 301 is pulled out thereof. The procedure proceeds to Step 737 for end-processing (5).

At Step 708, the sales management apparatus transmits a program requesting signal to the mode key 301. This signal is prepared by the CPU 101 according to a format defined by the loading program 105 and then transmitted to the mode key 301 by means of the IR interface 106.

At Step 709, a program loading message 401 is displayed on the display 109 to inform the operator that the program is now being loaded.

At Step 710, the sales management apparatus waits for a response from the mode key 301. Upon receipt of the response, the procedure advances to Step 711. In the event of a transmission failure, the procedure returns to Step 705 to procedure the error.

At Step 711, the received control program is stored in a specified memory area 102.

At Step 712, the CPU examines whether all the control programs have been received. If not, the procedure returns to Step 710. When all the programs have been received, the procedure proceeds to Step 713.

At Step 713, a check sum is calculated on data of all the received control programs.

At Step 714, the check sum data obtained at Step 713 is compared with previously calculated check sum data in order to check whether the received data is correct. The procedure returns to Step 705 if the check sum data did not agree with the previously calculated check sum data.

At Step 715, the sales management apparatus sends a signal to the mode key 301 to inquire whether the mode key stores the programs required. The inquiring signal is prepared by the CPU 101 according to a format defined by the loading program 105 and then transmitted to the mode key 301 by means of the IR interface 106.

At Step 716, the apparatus waits for a response from the mode key 301. On receipt of the response, the procedure advances to Step 717. If a transmission error occurred, the procedure proceeds to Step 705 for processing the error.

At Step 717, the apparatus analyzes the response from the mode key to examine whether the preset data and the sales result data are stored in the mode key. If not, the procedure jumps to Step 725 to finish receiving data.

At Step 718, the apparatus requests the mode key 301 to send preset data and the sales result data by sending a data requesting signal. This signal is prepared by the CPU 101 according to a format defined by the loading program 105 and then transmitted to the mode key 301 by means of the IR interface 106.

At Step 719, the apparatus waits for a response from the mode key 301. On receipt of the response, the procedure advances to Step 720. In the event of a transmission error, the procedure returns to Step 705 to for processing the error.

At Step 720, the received preset data and the sales result data are stored in a specified memory area 103.

At Step 721, the CPU examines whether all the preset data and sales result data have been received. If not, the procedure returns to Step 719. When all the programs have been received, the procedure proceeds to Step 722.

At Step 722, the sales management apparatus acknowledges receipt of a check sum of the preset data and the sales result data from the mode key 301. If no check sum was received due to transmission error, the procedure returns to Step 705 for ending the procedure with indication of transmission error.

At Step 723, a check sum is calculated on data of all the received control programs.

At Step 724, the check sum data obtained at Step 723 is compared with the check sum data received at Step 722 in order to check whether the received data is correct. The procedure returns to Step 705 if the check sum data did not agree with the received check sum data.

Figures 8A, 8B:
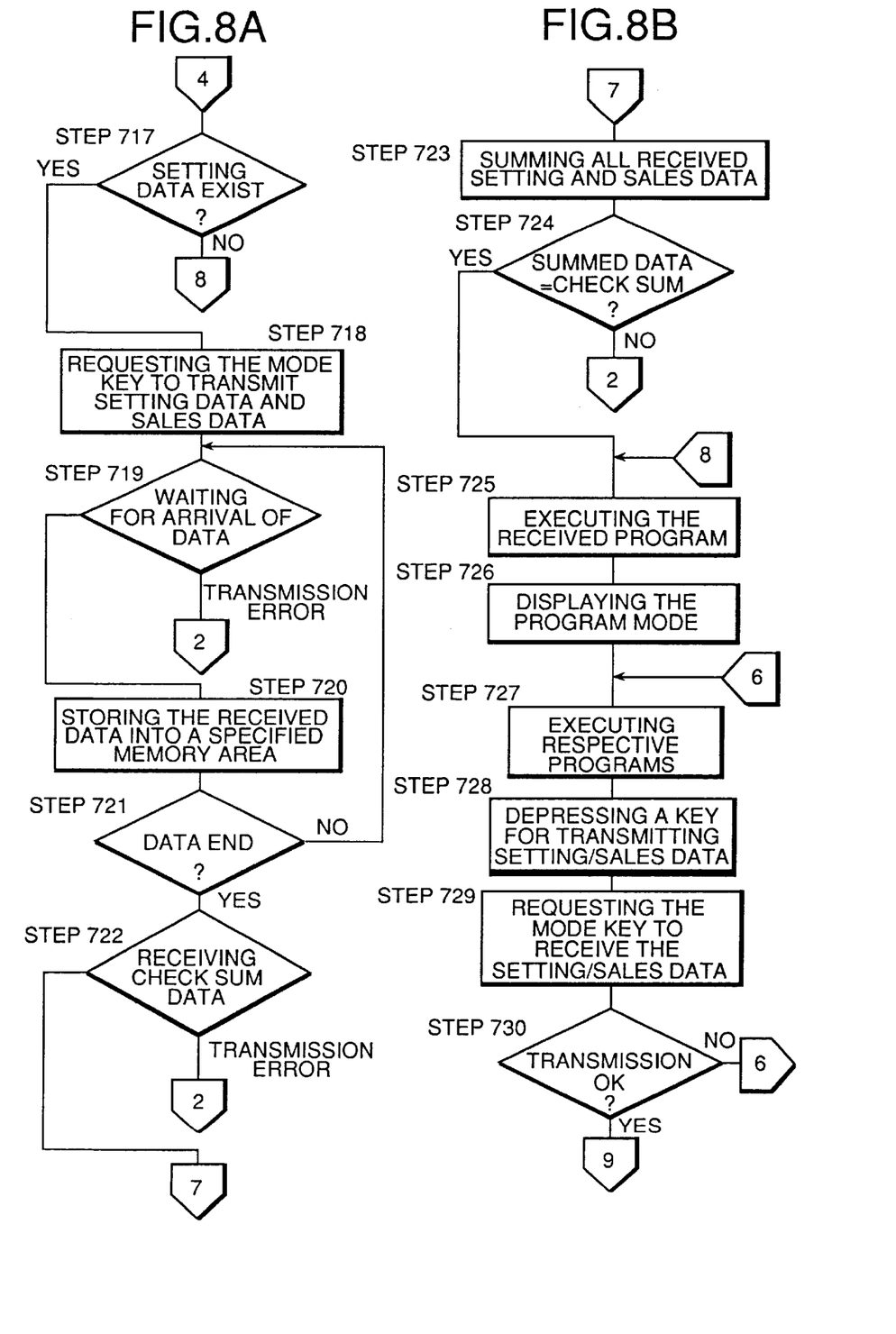
FIG. 8A is a flowchart (3) depicting the operation procedure of an embodiment of the present invention.
FIG. 8B is a flowchart (4) depicting the operation procedure of an embodiment of the present invention.

At Step 725, the received program is executed.

At Step 726, the program modes 402, 403, 404, 405 is displayed on the display 109.

At Step 727, the received programs are executed. A procedure of transmitting the preset data and sales-result data from the sales management apparatus to the mode key 301 is as follows:

At Step 728, a transmission key 205 of the sales management apparatus is turned on.

At Step 729, the sales management apparatus requests the mode key 301 to receive the preset data and the. sales result data by sending a requesting signal. This signal is prepared by the CPU 101 according to a format defined by the loading program 105 and then transmitted to the mode key 301 by means of the IR interface 106.

At Step 730, the apparatus waits for a response from the mode key 301. If the mode key could not receive the preset data and the sales result data because of a transmission error occurred, the procedure proceeds to Step 727.

At Step 731, the preset data and the sales result data are transmitted to the mode key. The procedure returns to Step 727 if a transmission error occurred.

At Step 732, the CPU examines whether all the preset data and sales result data have been transmitted. If not, the procedure returns to Step 731. When all the data have been transmitted, the procedure advances to Step 733.

At Step 733, the sales management apparatus calculates a check sum of the transmitted preset data and the sales result data.

At Step 734, the calculated check sum data is transmitted to the mode key 301. If no check sum was transmitted due to transmission error, the procedure returns to Step 705 for ending the operation with indication of transmission error.

Figure 9:
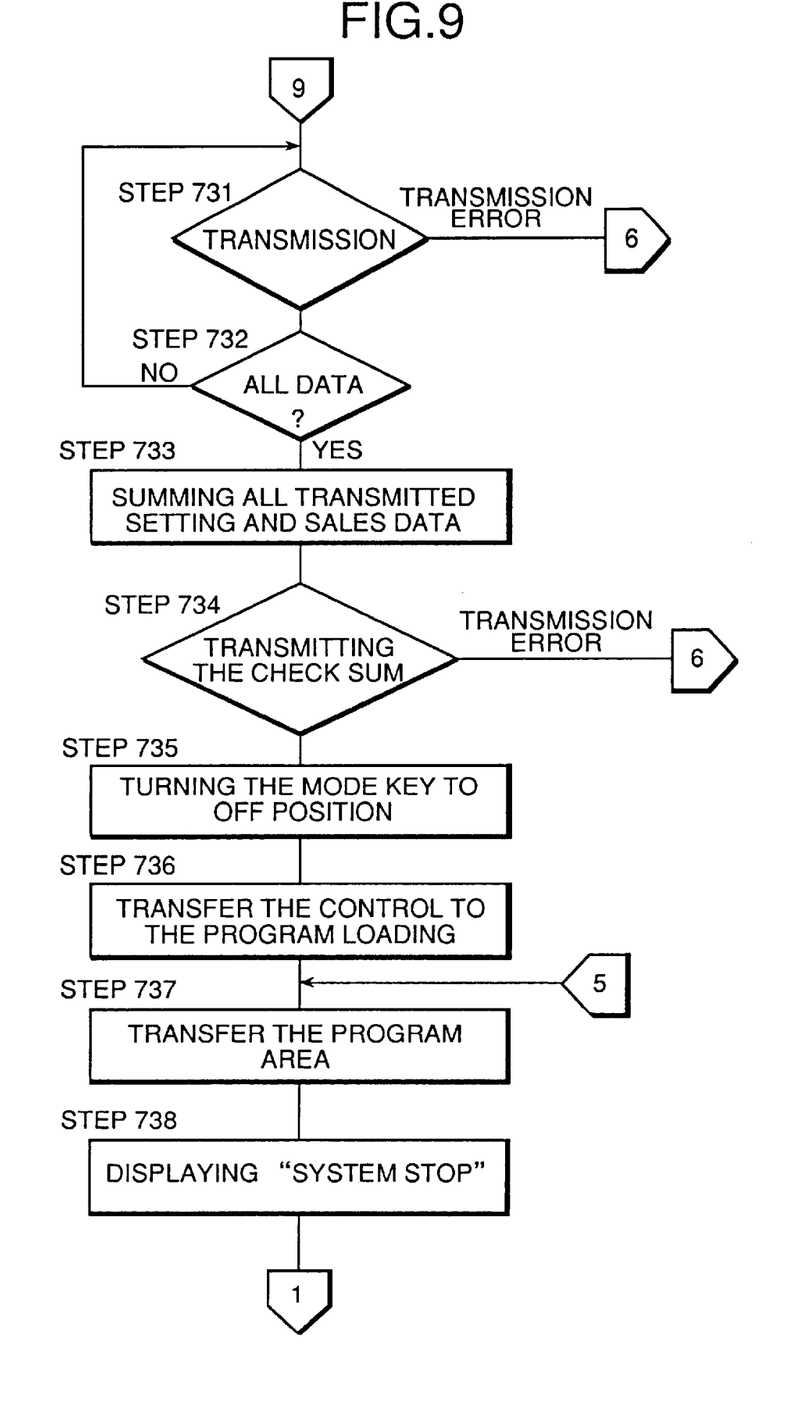
FIG. 9 is a flowchart (5) depicting the operation procedure of an embodiment of the present invention.

The procedure of pulling the mode key out of the sales management apparatus is as follows:

At Step 735, the mode key 301 is turned to set the mode switch 201 in the OFF-position. At the same time, the KDC 111 of the sales management apparatus informs the CPU 101 that the mode switch is switched OFF.

At Step 736, the CPU 101 calls the loading program 105.

AT Step 737, the CPU 101 clears off the program area 102.

At Step 738, a message "System stops" 406 is displayed on the display 109 to inform the operator that the programs were erased and the operation of the system became impossible. Namely. the sales management apparatus has no control program after removal of the mode key. This increases the security of the sales management apparatus. Whereby the present invention is realized.

The advantages of the present invention are as follows.

(1) In one aspect of the present invention a set of control programs "Registering", "Setting", "Checking" and "Exact Calculation" necessary for operating the sales management apparatus can be changed from one to another by replacing the mode key with another. This makes the sales management apparatus be free from the necessity of always storing all the programs, thus saving its memory capacity.

(2) In another aspect of the present invention the sales management apparatus has erased the control program not to be operated when a mode key is removed from the apparatus. This increases the security of the sales management apparatus.

(3) In another aspect of the present invention the sales management apparatus can be adapted to use in a store changing its working conditions for time-periods (morning, noon and night) in a day by selectively using one of the mode keys previously prepared according to the time-periods versions of menu-key layout and content and registering method.

(4) In another aspect of the present invention the mode key has a least contact with the mode switch of the sales management apparatus, thus reducing the mechanical breakage of both the key and switch.

(5) In another aspect of the present invention there is no need for the sales management apparatus to have a backup battery for supporting the control programs in the event of a power failure. This increases the reliability of the control programs.

(6) In another aspect of the present invention the frequency of transmitting the control programs from the mode key to the sales management apparatus can be reduced. This reduces time and frequency of writing in a flash memory and thereby elongates the service life of the flash memory which, as compared with standard RAM, needs longer time to write and is limited to the number of writing operations. Time taken for transmitting the control programs from the mode key to the sales management apparatus can be also reduced for every day.

(7) In another aspect of the present invention a mode key having records of data from one sales management apparatus can be used in common for another sales management apparatus. This makes it possible to obtain a total of sales and distribute the setting data without setting up an in-line system.

What is claimed is:

1. A sales management apparatus having a memory for storing information to be written and read for a control program, comprising:

means for changing a person in charge of the apparatus by the use of a mode key, the mode key including a memory for storing a control program and a means for transmitting the control program from the mode key when the mode key is operatively connected to the apparatus, so that said apparatus can operate according to control programs replaceable with another program by replacing in the apparatus the mode key with another mode key with any one of different control programs selected from the group consisting of registration, setting, checking, or exact calculation, whereby the apparatus can operate with a saved capacity of its memory and the mode key, which is operatively connected to the apparatus, keeps the apparatus in running operation.

2. A sales management apparatus as defined in claim 1, wherein the control program is cleared off, by pulling out the mode-key from the apparatus so as to completely forbid operation of the control program.

3. A sales management apparatus having a memory for storing information to be written and read for a control program, comprising:

means for changing a person in charge of the apparatus by the use of a mode key, a memory in the mode key for storing a control program and a means for transmitting the control program from the mode key, wherein said a control program stored in the mode key is changeable with another program in another mode key.

4. A sales management apparatus as defined in claim 1, wherein the control program can be transmitted from the mode key to the sales management apparatus by using infrared transmission to reduce contact area of said apparatus with the mode-key used.

5. A sales management apparatus as defined in claim 1, wherein the memory disposed in the sales management apparatus is a flash memory.

6. A sales management apparatus as defined in claim 5, wherein the mode key stores solely setting and exact calculating programs requiring higher security which realizes reducing time of transmission and the number of writing operations by reducing the frequency of transmission of control programs from the mode key.

7. A sales management apparatus as defined in claim 1, wherein said apparatus has a function for transmitting sales result data to the mode key and the mode key can transfer said sales result data to the another sales management apparatus.

8. A sales management apparatus as defined in claim 2, wherein the control program can be transmitted from the mode key to the sales management apparatus by using infrared transmission to reduce contact area of said apparatus with the mode key used.

9. A sales management apparatus as defined in claim 3, wherein the control program can be transmitted from the mode key to the sales management apparatus by using infrared transmission to reduce contact area of said apparatus with the mode-key used.

10. A sales management apparatus as defined in claim 2 wherein the memory disposed in the sales management apparatus is a flash memory.

11. A sales management apparatus as defined in claim 3 wherein the memory disposed in the sales management apparatus is a flash memory.

12. A sales management apparatus as defined in claim 10, wherein the mode key stores solely setting and exact calculating programs requiring higher security which realizes reducing in time of transmission and the number of writing operations by reducing the frequency of transmission of control programs from the mode key.

13. A sales management apparatus as defined in claim 11, wherein the mode key stores solely setting and exact calculating programs requiring higher security which realizes reducing time of transmission and the number of writing operations by reducing the frequency of transmission of control programs from the mode key.

14. A sales memory apparatus with a memory for storing information that can be written and read for a control program comprising:

means in the apparatus for receiving a plurality of different mode keys so that when a specific mode key is received the person in charge of the apparatus is changed, each one of the plurality of mode keys including a memory which stores a control program distinct from each other mode key, so that when the different ones of the mode keys are operatively connected to the apparatus distinct control programs with distinct functions can be delivered to the apparatus, and means for transmitting the different control programs with the different functions to the apparatus.

15. The sales management apparatus according to claim 14, wherein the means for receiving is a mode key slot.

16. The sales management apparatus according to claim 1, wherein the memory includes a ROM and a RAM.

* * * * *